Feb. 5, 1963 R. E. ROBERTS 3,076,737
CORRUGATED ANNULARLY REINFORCED HOSE AND METHOD
FOR ITS MANUFACTURE
Filed Nov. 15, 1957 4 Sheets-Sheet 1
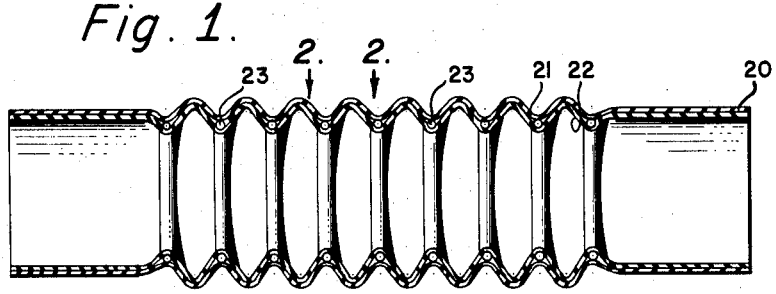
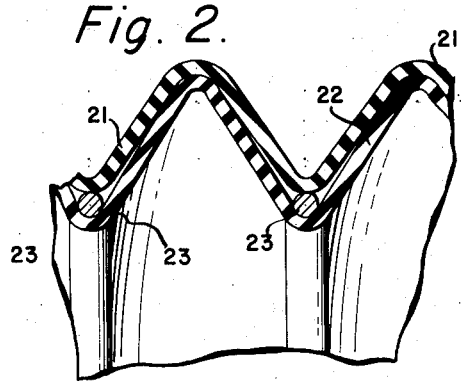
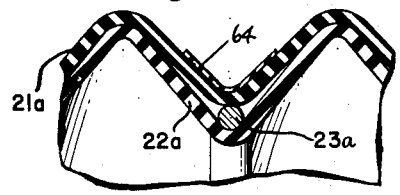
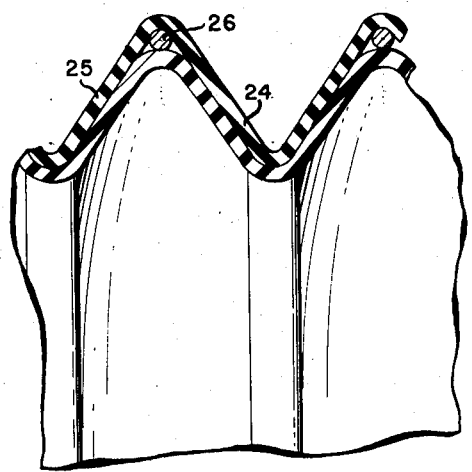
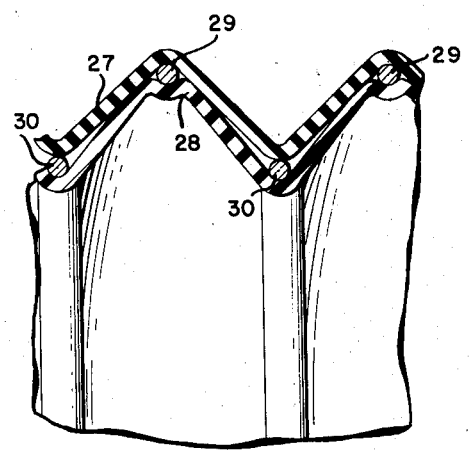
Robert Eldon Roberts,
*INVENTOR.*
BY *I. Louis Wolk*
*ATTORNEY.*

Feb. 5, 1963 R. E. ROBERTS 3,076,737
CORRUGATED ANNULARLY REINFORCED HOSE AND METHOD
FOR ITS MANUFACTURE
Filed Nov. 15, 1957 4 Sheets-Sheet 2

Robert Eldon Roberts,
*INVENTOR.*

BY

*ATTORNEY.*

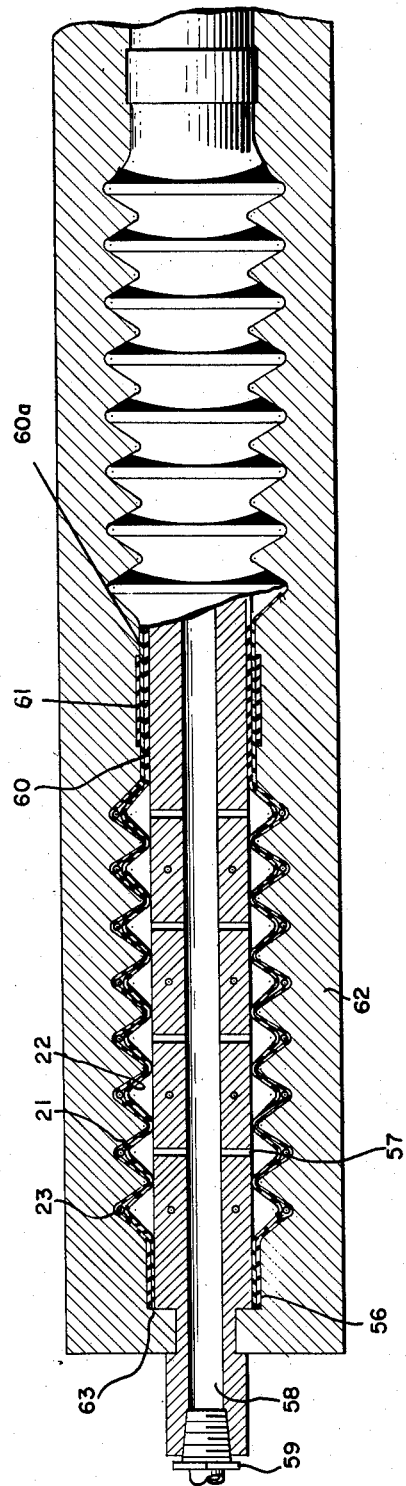
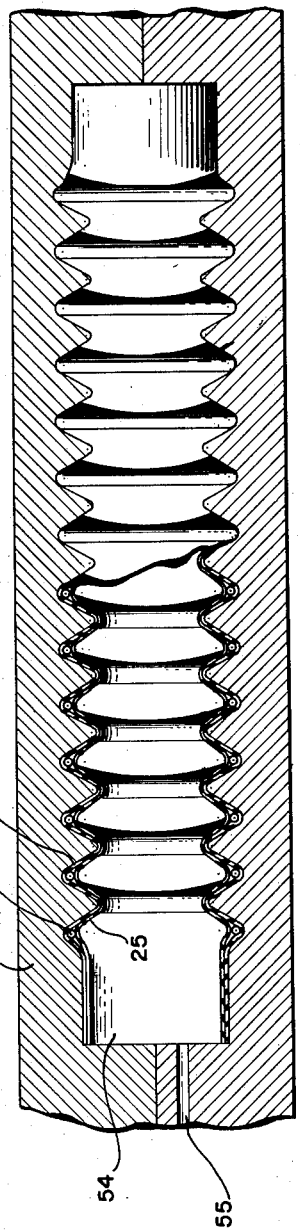
Robert Eldon Roberts,
INVENTOR.
BY *J. Louis Wolfe*
ATTORNEY.

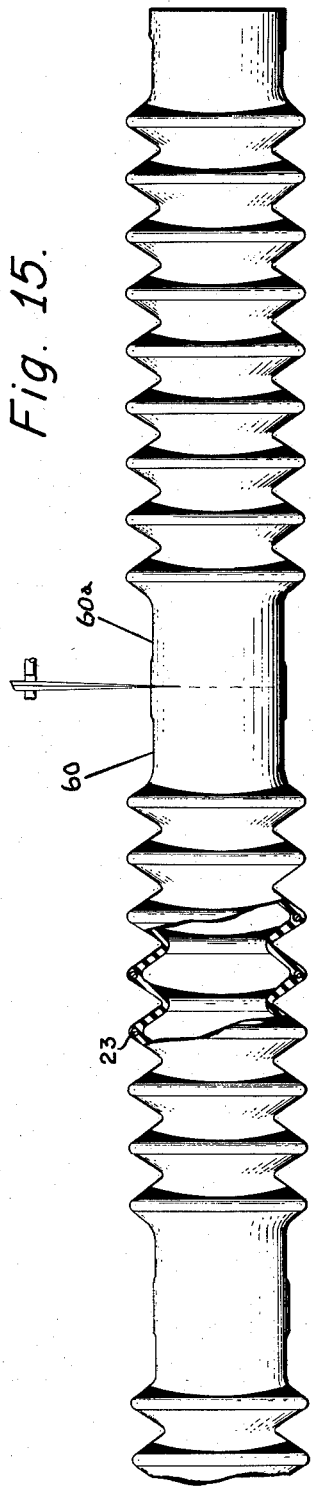
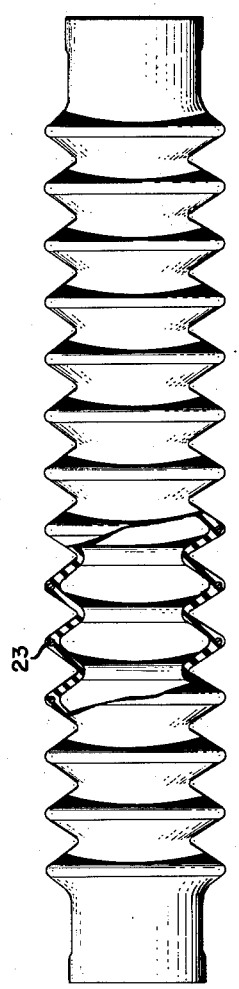
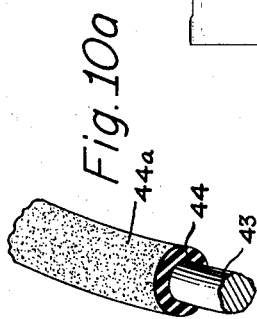
Robert Eldon Roberts,
INVENTOR.
BY
ATTORNEY.

United States Patent Office 3,076,737
Patented Feb. 5, 1963

3,076,737
CORRUGATED ANNULARLY REINFORCED HOSE
AND METHOD FOR ITS MANUFACTURE
Robert E. Roberts, Wilton, Conn., assignor to Fred T.
Roberts & Company, Wilton, Conn., a partnership
Filed Nov. 15, 1957, Ser. No. 696,815
20 Claims. (Cl. 156—48)

The present invention relates to corrugated, reinforced, flexible hose, and more particularly to such hose having axially spaced annular reinforcing members positioned or embedded therein, and to the method for the manufacture of such hose.

This application is a continuation-in-part of my copending application Serial No. 441,107, filed July 2, 1954, now Patent No. 2,813,573.

Hose of the type described herein is generally utilized in the cooling systems of combustion engines, and for many other purposes where flexibility and resistance to radial pressures, either internal or external, require ultization of reinforcing means within the body of the hose. Such hose is commonly formed of elastomeric materials, with or without fabric, the most commonly utilized of such elastomeric materials being natural rubber and synthetic rubber-like materials such as the butadiene-styrene or butadiene-acrylic nitrile copolymers, polyvinyl chloride, and the like. In accordance with applicant's copending application referred to above, flexible, annularly corrugated, reinforced hose is obtained by preforming the hose body with inner and/or outer annularly corrugated layers with spaced annular reinforcing rings, or the like, positioned between them, the resulting assembly being vulcanized after formation. Metal rings are generally used as reinforcements and such rings may be positioned in the crests and/or the troughs of the annular corrugations of the hose. Suitable metal rings may be made on an automatic machine of the type commonly used for producing springs. Such machines are well known and generally include an automatic cutoff which may be set to cut just one coil at a time, so that the ends of the wire forming the coil either meet or are spaced apart or overlap, as is desired. The ends of the rings may be spot welded together if desired. As described in applicant's previous application referred to above, the hose is made by positioning a base layer of stretchable, vulcanizable material on a radially stretchable tubular body adapted to be inflated to form a corrugated surface thereon, inflating the tubular body to stretch radially into corrugated form while permitting axial shortening thereof, positioning a plurality of parallel, axially spaced reinforcing rings over the base layer before and/or after partial inflation of the tubular body, building up a hose wall on the base layer and reinforcing rings by applying a second layer of stretchable, vulcanizable material over the rings, deflating the tubular body, removing the preformed hose therefrom, and thereafter vulcanizing the formed hose either in open steam or in a mold. In accordance with the present invention, applicant preforms hose bodies to the general or approximate configuration desired in the final product by the method described in the aforesaid copending application, and introduces these in the unvulcanized condition into closed molds wherein the final vulcanization takes place. This is accomplished without incurring defects known heretofore resulting from the formation of hollow blown rubber articles which were not properly and accurately formed before being placed in the mold. Accordingly, products of applicant's present invention will have the correct size, shape and contour for insertion into a mold, after which they may readily be set or vulcanized into final form while retaining the reinforcing members and other elements of the hose in proper alignment with the corresponding cavities in the mold. These preformed hose bodies are preferably formed in the manner described in applicant's copending application referred to above, or in any other suitable manner. The hose being annularly corrugated will readily conform to the corrugations in the mold, and since the hose body is preferably formed to easily fit within the mold and preferably to a slightly smaller outside diameter than the inside diameter of the mold cavity, the mold can be readily closed without pinching.

The preformed hose may be made to have a number of alternative constructions and the method lends itself to efficient mass quantity production due, at least in part, to the fact that any number of hose sections may be preformed in advance and held ready for the final operation, which may be carried out at any time desired or when suitable press capacity is available.

Therefore, a principal object of the present invention is to provide a corrugated, annularly reinforced, flexible hose and method for its manufacture, which hose possesses a fully molded exterior and an extremely uniform construction.

It is another object of the present invention to provide a method for the manufacture of hose of the type described which is extremely simple and efficient, and at the same time produces uniform products of high quality.

Other objects of the invention will be apparent from a consideration of the specification and claims and the drawings appended hereto.

Referring to the drawings:

FIGURE 1 is a view in vertical transverse cross-section showing a preformed hose section prior to molding to final form.

FIG. 2 is an enlarged vertical cross-section of a portion of FIG. 1 taken along lines 2—2.

FIG. 2a is a modification of FIG. 2.

FIG. 3 is an enlarged vertical cross-section taken through a section of a modified type of hose corresponding in general to the form illustrated in FIG. 2.

FIG. 4 is a vertical transverse cross-section illustrating still another preformed hose construction.

FIGS. 8 to 12, inclusive, illustrate in vertical transverse cross-section alternative forms of preformed hose constructions utilized in accordance with the invention.

Figure 10:
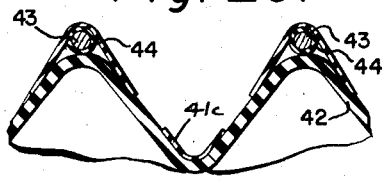

FIG. 10a is a detailed fragmentary view of the reinforcing ring of FIG. 10.

FIG. 13 illustrates in vertical transverse cross-section and partly in elevation the manner in which a preformed hose segment is molded to final condition in a mold.

FIG. 14 illustrates partly in cross-section and partly in elevation the manner of assembling a plurality of preformed hose segments on a mandrel and molding them.

FIG. 15 illustrates in partial cross-section and partly in elevation the structure of the finished hose produced in accordance with FIG. 14.

FIG. 16 illustrates partly in cross-section and partly in elevation the structure of the finished hose produced in accordance with FIG. 13.

Referring now to the drawings and particularly to FIGS. 1 and 2, a preformed hose member 20 is illustrated formed of two layers of unvulcanized rubber or other elastomeric material 21 and 22, respectively, between which are positioned a series of axially spaced reinforcing rings 23. This member is formed by the method described in the aforementioned copending application in which a tubular, elastomeric body is positioned over an inflatable mandrel. The spaced rings are then positioned over said tubular body. An outer tube, also of elastomeric material, is then applied over the inner tube and rings, preferably being cemented thereto with a vulcanizable rubber cement. These tubes are in the unvulcanized condition, although they may be partially vulcanized if desired. Of course if the elastomeric material is a nonrubber composition, such as polyvinyl chloride, vulcanization is not required, since these layers can be united by heating and then cooling to set. In such case a conventional tacky resinous cement, or solvent, may be used to hold the layers together until curing is carried out. After assembly of the layers with the reinforcing rings inbetween, the inflatable mandrel is inflated to force the unreinforced areas outward, thereby forming corrugations with the rings in the valleys thereof and drawing the ends of the tube together to form a product such as is shown in FIG. 1 and in enlarged detail in FIG. 2. The two layers are held together by the cement which assists in retaining the shape of the assembly.

An alternative construction for a preformed hose segment is illustrated in FIG. 3 wherein reinforcing rings 26 are interposed between tubular layers 24 and 25, the layers being cemented together prior to the expansion of the mandrel. In this case the rings are of substantially greater diameter than the original inner tube, and the outer tube 24 is stretched thereover and is maintained in its stretched condition surrounding the rings while it retains sufficient tension to tend to return to its original diameter, thus forming the valleys of the convolutions. In this modification also, cementing of the layers to each other is desirable in order to hold them together in the expanded condition prior to the molding operation.

FIG. 4 illustrates a form of construction which is a combination of that illustrated in FIGS. 2 and 3 in which inner rings 30 are interposed between the elastomeric layers, and since these rings are of smaller diameter, they form the valleys of the convolutions, while rings 29, also interposed between tubular layers 27 and 28, being of greater diameter form the crests. In this modification, the tubular layer 28 is positioned over an inflatable mandrel, rings 30 are then spaced thereover in engagement therewith. As described in the aforementioned copending application, at this point the larger diameter rings are maintained in proper axial position by means of racks, and the inflatable mandrel then inflated until the inner tube engages these rings 29. Since the rings are then held firmly by internal pressure, the spacing racks are removed and an outer tube 27 may then be stretched thereover. The two tubes are held together by a layer of vulcanizable rubber cement applied to tube 28 before the application of tube 27, since the cement becomes tacky and tends to hold the layers together until the assembly is placed in the mold.

Figure 5:
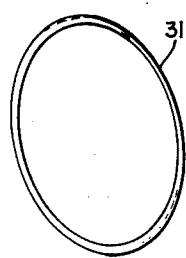
FIG. 5 is a view in elevation illustrating a continuous type of reinforcing ring made in accordance with the present invention.
Figure 6:
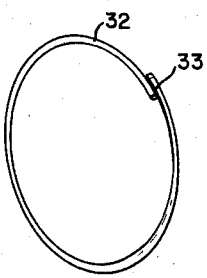
FIG. 6 is a view in elevation of another type of reinforcing ring utilized in the present invention.
Figure 7:
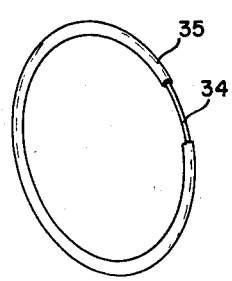
FIG. 7 is a view in elevation and partly in cross-section illustrating an elastomer covered reinforcing ring which may be utilized in the invention.

Rings of the type described for use as annular reinforcements are illustrated in FIGS. 5, 6 and 7. As shown in FIG. 5, ring 31 is a continuous wire member in which the abutting ends may be welded together, or, if desired, welding may be omitted and the ends may engage each other only by abutting contact. As shown in FIG. 6, ring 32 is provided with overlapping ends 33 which may or may not be welded. However, in this form the overlapping ends do not require welding, particularly if they are provided with an elastomeric cover, as illustrated in FIG. 7, wherein ring 34 is provided with an elastomeric or rubber covering 35. Either of these types of rings may be utilized, depending upon the results desired. It is frequently desirable to ensure the removal of as much air as possible between the layers by applying rubber bands or tapes over the outer surface of the assembly positioned over the annular rings to draw the tubes together and eliminate air pockets. This is accomplished by applying tape over the tube in the troughs of FIGS. 2 and 4, and over the crests in FIGS. 3 and 4. As shown in FIG. 2a, for example tape 64 is applied over tube 21a and wire reinforcement 23a drawing them down against tube 22a, and eliminating the air pockets. The tape is preferably of vulcanized resilient rubber and is removed after the cement has hardened or before vulcanization. Of course unvulcanized rubber strips of vulcanizable compound may be used and left in place to become integrally united during vulcanization.

Figure 8:
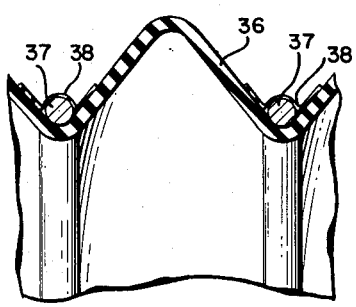
Figure 9:
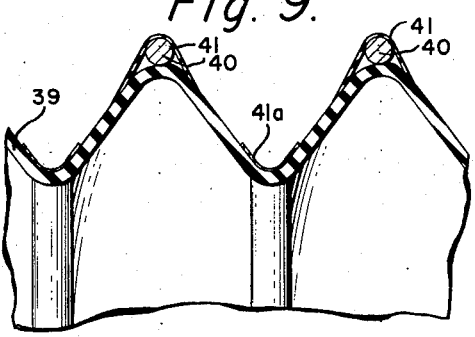

FIGS. 8 to 12, inclusive, illustrate forms of the invention in which preformed tubes are provided which eliminate the outer tube, replacing the outer tube by means of tape or other means for anchoring the reinforcing rings in position. As shown in FIG. 8, an inner tube 36 is provided with axially spaced rings 37. In this modification, the tube is positioned over an inflatable mandrel, the rings then slipped thereover in engagement therewith. Tape 38, which may be of a stretchable, elastomeric material, preferably unvulcanized or partially vulcanized, or of stretchable or elastic fabric, is then applied over each ring. At this point the inflatable mandrel is expanded and formed into a corrugated member of the type described above and as illustrated in FIG. 8. The modification illustrated in FIG. 9 corresponds substantially to that described in FIG. 8, except that the rings and tape are positioned at the crests instead of in the valleys. In this form of the invention, the tubular member is applied over an inflatable mandrel, the rings of greater diameter 40 are spaced axially thereof by means of a rack. Thereupon, rubber tape or cord 41a is applied between these rings over the tube in the position where the valleys of the tube are to be formed, and the inflatable mandrel is then expanded with the valleys being formed by the tape referred to and the crests by the expansion of the tube 39 into engagement with the rings 40. At this point tape 41 is applied over the rings to retain them in position and the inflatable mandrel is deflated, after which the tape in the valleys may be removed if desired. The tape is of vulcanizable rubber compound and may be adhered further by means of vulcanizable rubber cement to hold the ring in place until the assembly is cured. The product obtained conforms substantially to that which is illustrated in FIG. 9.

In the form of the invention illustrated in FIG. 10, tube 42 is positioned upon an inflatable mandrel in the manner described above. Rings 43 of greater diameter are then positioned in axial alignment by means of racks, as has been described. These rings may have a rubber coating 44 of the type shown in FIG. 7, which is preferably unvulcanized, and they are coated with a layer of tacky adhesive 44a prior to application to the tube. At this point tape or cord 41c is applied over the tube intermediate the ring to act as the holddown to form the valleys of the tube. The inflatable mandrel is then inflated until the crests of tube 42 engage the rings and become bonded thereto by means of the adhesive, the assembly being allowed to remain in this position until the adhesive is set. At this point the mandrel is deflated, the intermediate tape or cord removed if desired, and the final product conforms to that shown in FIG. 10. This assembly is then ready for molding as described below, in which operation the ring becomes embedded in the tube through flow of rubber into the mold cavity and around the rings.

Figure 11:
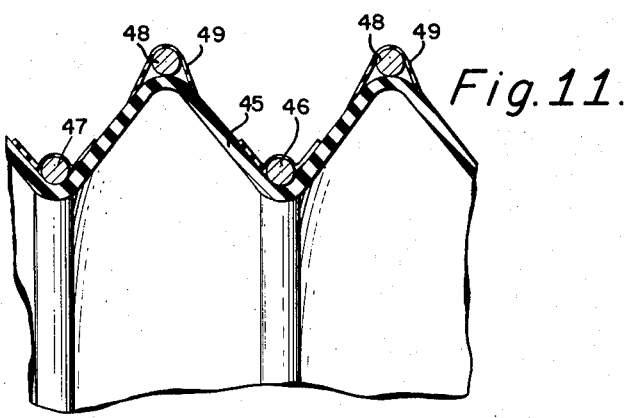

In the form of the invention illustrated in FIG. 11, the constructions of FIGS. 8 and 9 are, in effect, combined. In making this form, tubular, elastomeric member 45 is positioned over an inflatable mandrel, rings 46 conforming substantially to the diameter of the tube are positioned thereover and taped to the tube by a layer of elastomeric tape 47. Rings 48 of greater diameter are positioned about the tube and held in proper axial alignment by means of spacing racks, as described in the aforementioned application. The inflatable mandrel is then expanded until the tube engages the outer ring 48, at which point these rings are taped to the tube by means of a layer or strips of tape 49. The inflatable mandrel is then deflated and a preformed hose member, such as illustrated in FIG. 11, is obtained.

Figure 12:
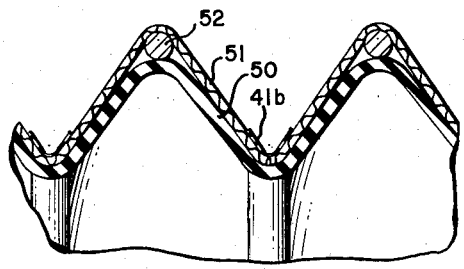

As shown in FIG. 12, a modified form of tube member having an outer fabric cover is obtained by positioning the tubular elastomeric member 50 over an inflatable mandrel. Rings 52 of greater diameter are spaced axially, as described above, and tubular elastic or stretchable fabric member 51 formed of a stretchable weave and commonly known as a stockinette is then stretched over the rings. The stockinette is then corded down to the tube by means of temporary or permanent tape or cord in the manner described above. At this point the inflatable mandrel is expanded until tube 50 engages rings 52 and fabric 51. Tube 50, which has previously been coated with a tacky cement layer, attaches itself to the inner surface of the fabric member and remains in that position when the inflatable mandrel is then deflated.

Any of the forms of the invention described above which represent preformed, unvulcanized hose members are then molded to final condition in the mold assembly illustrated in FIG. 13. As shown, a two part mold 53 is provided with a corrugated mold cavity 54 and an air or steam inlet 55 communicating therewith. When the mold is opened the preformed hose section 25 is inserted therein; the mold is then closed and clamped in a press or otherwise. Steam or air is then introduced through opening 55 under pressure. The mold is simultaneously heated to the vulcanizing or curing temperature and the resulting heat and pressure cause the preformed hose section to conform to the inner surface of the mold and enables the elements thereof to become integrally united or vulcanized together. As illustrated in FIG. 13, a hose construction conforming to that illustrated in FIG. 3 is shown under pressure and with tubular members 24 and 25 integrally united with annular rings 26 being embedded therebetween. Upon the conclusion of the curing period, the mold, which has been heated in a press or in an open heated chamber, is allowed to cool, the mold opened and the finished hose removed therefrom. The completed hose produced in this way is illustrated partially in cross-section in FIG. 16.

In a further modification of the invention illustrated in FIGS. 14 and 15, a plurality of preformed hose elements are assembled in tandem in abutting relationship on an elongated mandrel. As illustrated, preformed hose members corresponding to the construction illustrated in FIG. 4 are utilized, although any preformed member of the type described above may be used in addition to, or in place of, these members which are selected for purposes of illustration only. As shown, two or more of these members are arranged in end to end relationship upon an elongated mandrel 56 which is provided with radially extending openings 57 communicating with an internal bore 58 designed to be supplied with steam or air under pressure through fitting 59. Abutting sleeves or collars of the hose members, as shown at 60 and 60a, are preferably united by means of a layer of tape 61. This tape is preferably, but not necessarily, of unvulcanized or partially unvulcanized elastomeric material, although fabric or vulcanized tape may be utilized if desired. The taping may be eliminated, however, since it is utilized primarily to prevent leakage of air or steam from the interior of the mandrel into the mold cavity and for more effective handling and disassembly.

The assembled hose sections on the mandrel are then inserted into a two part mold, shown in FIG. 14, in which mold 62 is provided with mold cavity 63, the corrugations of which are designed to conform substantially to the dimensions of the preformed hose segment. However, in each case where the mold is utilized, a slight clearance is preferably provided to permit flow of the elastomeric material around the reinforcement and to ensure a suitable covering of elastomeric material surrounding the reinforcement. After introduction of the elongated mandrel with the hose segments positioned thereon into the mold cavity, the mold is closed and steam or air admitted under pressure while the mold is heated in a platen press or in open steam, or the like, until vulcanization or setting thereof is achieved. Where the tubular materials are of vulcanizable, elastomeric material, such as rubber or synthetic rubber, or the like, vulcanization can be carried out at temperatures in the range of 300° to 350° F. for a period of 15 minutes to one-half hour, depending upon the nature of the composition. On the other hand, if thermoplastic elastomeric materials, such as polyvinyl chloride, are utilized, these may be heated to about 350° F. to cause the materials to flow together after which the mold is cooled to allow these to set to their permanent form. After the cure is completed, the mold is opened and the elongated mandrel removed, and the completed hose sections are then cut at their point of juncture, as illustrated in FIG. 15, resulting in individual sections as shown in FIG. 16.

It is apparent that the foregoing method produces a product in which the axially spaced reinforcements are embedded within an elastomeric tubular body and in which the position of the reinforcing members is accurately and uniformly maintained. As a result, the product is flexible and durable, and the reinforcements are prevented from exposure at the surface due to misalignment which might otherwise occur. Furthermore, the hose has a smooth outer surface conforming accurately to the mold due to the internal pressure utilized in its manufacture.

The inventor claims:

1. A method for the manufacture of reinforced, annularly corrugated hose which comprises forming a tubular member of elastomeric material, positioning thereover a plurality of annular reinforcing members axially spaced from each other, corrugating the portion of the body carrying the reinforcing members to provide an intermediate corrugated wall portion and noncorrugated end portions, positioning said tubular member and said reinforcing members thereon within a hollow internally corrugated mold with said reinforcing members in alignment with the corrugations of the mold, and subjecting said tubular member to internal pressure accompanied by heating to cause it to expand and soften and conform to the shape of said mold while simultaneously flowing around and embedding said annular members therein.

2. A method according to claim 1 wherein said reinforcing members are in alignment with and positioned within said corrugations.

3. A method according to claim 1 wherein said reinforcing members are in alignment with and positioned adjacent to the corrugations in the mold conforming to the valleys of the resulting tube.

4. A method according to claim 1 wherein the tubular member is composed of vulcanizable, elastomeric material and wherein vulcanization is effected by continued heating and internal pressure after said reinforcing members have become embedded therein.

5. A method according to claim 1 wherein the tubular member is composed of thermoplastic, elastomeric material which is allowed to set by cooling after said reinforcing members have become embedded therein.

6. A method according to claim 1 wherein the reinforcing members are coated with an elastomeric material prior to embedding them in said tubular member.

7. A method of making a flexible, annularly corrugated, reinforced hose which comprises forming a hose wall of vulcanizable material with annular reinforcements disposed therein and having an intermediate corrugated wall portion and noncorrugated end portions, placing said formed hose wall in a mold having a mold cavity provided with an internal wall shaped complementary to the formed hose, vulcanizing the formed hose while maintaining fluid pressure within and directly against the hose wall to press the intermediate portion of the hose against the wall of the mold cavity and while protecting the end portions of the hose from the action of such fluid pressure.

8. A method of making a flexible, corrugated hose which comprises forming a hose wall having internal axially spaced annular reinforcements, preforming a hose body in unvulcanized condition and having annular corrugations therein, said reinforcing members being bonded to said corrugations, positioning the resulting preformed hose member within an annularly corrugated mold wherein said annular reinforcements are in alignment with the corrugations of the mold, introducing fluid pressure internally of said hose while subjecting said mold to heat and thereby vulcanizing the preformed hose to conform to the shape of the mold and thereafter removing the hose from the mold.

9. The method of making a molded, flexible, corrugated hose having axially spaced annular reinforcements embedded therein which comprises preforming a hose body composed of an inner tubular elastomeric member and a series of axially spaced annular reinforcements superimposed thereon and bonded thereto, introducing the preformed hose body into an annularly corrugated mold with said annular reinforcements in alignment with the corrugations in said mold, thereafter subjecting said hose body to internal pressure while heating the mold to cause the material of the hose body to flow around the reinforcements and embed them therein, and thereafter removing the completed hose body from the mold.

10. A method according to claim 9 wherein the preformed hose body is composed of two tubular layers having the axially spaced annular reinforcing members positioned therebetween within the valleys of the corrugations.

11. A method according to claim 9 wherein the reinforcing member is positioned between two tubular layers of elastomeric materials in the crests of the corrugations.

12. A method according to claim 9 wherein the preformed hose body comprises axially spaced annular reinforcements positioned between two tubular layers of elastomeric material in the valleys of the corrugations and additionally comprises axially spaced annular reinforcing members of greater diameter positioned between said tubular layers in the crests of the corrugations.

13. A method according to claim 9 wherein the preformed, corrugated hose body comprises axially spaced annular reinforcements positioned in the valleys of the corrugations and taped thereto by means of resilient tape.

14. The method according to claim 9 wherein the preformed, corrugated hose body comprises axially spaced reinforcing members bonded to the tubular layer at the crests of the corrugations by means of resilient tape.

15. The method according to claim 9 wherein the axially spaced annular reinforcements are bonded to the crests of the corrugations of the tubular layer by means of adhesive.

16. The method according to claim 9 wherein axially spaced reinforcing members are bonded to the valleys of the corrugations of the tubular layer by means of resilient tape and additional axially spaced annular reinforcing members of greater diameter are bonded to the crests of the corrugations of the tubular layer by means of resilient tape.

17. The method according to claim 9 wherein the axially spaced annular reinforcing members are positioned between an inner tubular layer of elastic material and an outer layer of stretchable fabric.

18. The method of making molded, flexible, corrugated hose having axial reinforcing members embedded therein which comprises preforming a plurality of hose bodies composed of an inner tubular elastomeric member and axially spaced reinforcements superimposed thereon and bonded thereto, positioning said hose bodies in end abutting relationship within an internally corrugated cavity in a mold with said reinforcements, in predetermined alignment with the corrugations in said mold, expanding said hose bodies within said mold under heat and internal pressure to cause the inner tubular member to conform to said mold and flow around and embed said reinforcements and removing said hose bodies from said mold after said elastomeric material has set.

19. The method according to claim 18 wherein said hose bodies in end abutting relationship are joined by a layer of tape to prevent leakage of fluid into said mold cavity and wherein said tape is cut after removal from the mold to separate the hose bodies.

20. The method according to claim 19 wherein the hose bodies are arranged upon a hollow perforated mandrel and wherein the internal pressure is applied by means of fluid entering through said mandrel and said perforations.

References Cited in the file of this patent

UNITED STATES PATENTS

| | | |
|---|---|---|
| 2,486,763 | Roberts | Nov. 1, 1949 |
| 2,557,932 | Baymiller | June 26, 1951 |
| 2,622,623 | Michaudet | Dec. 23, 1952 |
| 2,741,267 | McKinley | Apr. 10, 1956 |
| 2,766,806 | Rothermel et al. | Oct. 16, 1956 |
| 2,779,976 | Roberts et al. | Feb. 5, 1957 |
| 2,780,273 | Roberts | Feb. 5, 1957 |
| 2,780,274 | Roberts et al. | Feb. 5, 1957 |
| 2,782,803 | Rothermel et al. | Feb. 26, 1957 |
| 2,813,573 | Roberts | Nov. 19, 1957 |

FOREIGN PATENTS

| | | |
|---|---|---|
| 328,806 | Germany | Nov. 5, 1920 |